United States Patent [19]

Seufert

[11] 4,036,540
[45] July 19, 1977

[54] SCREW EXTRUDER HOUSING

[75] Inventor: Wilhelm Seufert, Korntal, Germany

[73] Assignee: Werner & Pfleiderer, Stuttgart, Germany

[21] Appl. No.: 579,008

[22] Filed: May 19, 1975

[30] Foreign Application Priority Data

June 1, 1974 Germany .............................. 2426732

[51] Int. Cl.² ............................................. F16C 33/00
[52] U.S. Cl. .................................... 308/239; 259/192
[58] Field of Search ............... 308/236, 237, 238, 239; 259/192

[56] References Cited

U.S. PATENT DOCUMENTS

| 1,422,655 | 7/1922 | Brehmer | 308/239 |
|---|---|---|---|
| 3,455,619 | 7/1969 | McGrath | 308/239 |
| 3,497,278 | 2/1970 | Orndorff, Jr. | 308/239 |
| 3,804,382 | 4/1974 | Pultz | 259/192 |
| 3,900,188 | 8/1975 | Seufert | 259/192 |

FOREIGN PATENT DOCUMENTS

| 1,943,626 | 3/1964 | Germany |
| 7,320,419 | 5/1973 | Germany |
| 2,256,671 | 12/1973 | Germany |

Primary Examiner—Richard A. Bertsch
Attorney, Agent, or Firm—Browdy and Neimark

[57] ABSTRACT

A screw extruder housing is made wear-resistant by providing a non-metallic lining formed of brittle material, the lining being divided into a multiplicity of individual wearing units firmly anchored in place in the casing.

8 Claims, 6 Drawing Figures

SCREW EXTRUDER HOUSING

FIELD OF INVENTION

The invention relates to a screw extruder housing, e.g. for material conveyors or the like, provided with protection against wear, for a screw extruder machine, which casing has one or more axially parallel bores each of which received a screw shaft, the wall of each screw bore being provided with a wear-resistant lining.

BACKGROUND

A screw extruder housing of this kind is known, for example, from FIG. 1 of German Gebrauchmuster No. 7,320,419, in which each of two interconnected bores has a wear insert made of a thin-walled bimetal tube. For this purpose each bimetal tube has a portion milled away. After this portion has been milled away, the two tubes are either inserted singly into the casing and welded or pinned to the latter, or before insertion into the casing are welded together at their contact surfaces in the region of the saddles, i.e. the region at which the walls of the bores meet.

Furthermore, it is known, for example, from U.S. Pat. No. 3,900,188 to make a screw extruder housing from a normally solid material and to solder in position an inserted wearing sleeve. In addition, it is known for wearing sleeves of this kind to be shrunk into position.

Moreover, it is known for screw extruder housings to be made of a special solid material and for the walls of the bores to be hardened by nitriding, case hardening, boriding, or ionitriding. It is likewise known to make screw extruder housings of this kind from individual tubes whose inner walls are coated with a wear-resistant layer of metal or metal oxide powders applied by centrifuging. It is also known to produce a wearing coating by hard chromium-plating, hard nickel-plating or spraying with metal oxide powders. In the case of spraying with metal oxide powders, ceramic powders are in some cases used as binders with low-melting metal powders.

In all these known screw extruder housings provided with protection against wear, the production of the wear-resistant lining or coating protecting against wear on the walls of the bores entails heavy expense for production, while in addition wear-resistance still leaves much to be desired.

From German Gebrauchmuster No. 1,943,626 it is known for grooves to be provided in the region of the so-called saddle points in a worm casing having two axially parallel interconnected bores, and to insert in these bores special saddle elements which on their surfaces coming into contact with the material being processed are strengthened with media protecting against wear, these saddle elements being adapted to be tightened from outside by means of clamp screws and pressing the wearing bushes, with prestressing, uniformly firmly and tightly against the cylinder casing.

SUMMARY

It is an object of the invention to overcome the defects of the prior art, such as indicated above; it is another object to provide a wear-resistant screw extruder housing of the kind first described above using non-metallic, brittle materials for the wear-resistant lining, while maintaining expense for design and production at a minimum.

According to the invention there is provided a screw extruder housing for a screw extruder machine, which housing has one or more axially parallel bores for a screw shaft or shafts, the wall of each bore being provided with a wear-resistant lining, the wall of each bore being provided over its periphery with recesses which are bounded by lands formed between adjacent recesses and in which recesses wearing inserts are located to form said wear-resistant lining. The previous technique of using one-piece wearing sleeves is therefore completely discarded, and the lining is divided into a multiplicity of individual wearing inserts. Because of the extremely firm anchoring of the wear-resistant lining to the screw extruder housing, which is achieved because of the recesses, it is also possible to use brittle and hard, highly wear-resistant materials.

In a particularly simple embodiment the recesses are formed in the wall of the bore, parallel to the axis of the latter, with a cross-section which is uniform over their length, thus leading to extremely simple production of the recesses. According to another advantageous feature of the invention it is then possible for the wearing inserts to consist of pre-shaped parts in the form of plates, bars or strips. These parts can be then inserted or pressed into the recesses. In particular, they may also be additionally cemented, adhesively bonded, or soldered in position. With this type of construction the wearing inserts may be made of practically any metallic or non-metallic materials, as will be explained more fully further on.

In another embodiment of the invention the wearing inserts may be introduced into the recesses in a formable state and may consist of a curing, curable, or solidifying material. For this form of introduction of the wearing inserts by spreading, pouring, or centrifuging the material it is possible in particular to use non-metallic materials, as will be further explained in detail later on.

In all cases it is particularly advantageous for the recesses to have an undercut profile, preferably a dovetail profile, so that positive engagement is achieved between the wearing insert and the lands.

According to an advantageous preferred feature of the invention the surfaces of the lands are flush with the wearing inserts. In this case, although the surfaces of the lands are exposed to the materials being processed, no noteworthy wear will occur on the lands, because the wearing inserts perform a supporting function. The only prerequisite for this action is that the free surface of the lands should be markedly smaller than the exposed surface of the wearing inserts.

If on the other hand, in a rather more expensive embodiment, the wearing inserts are arranged to cover the lands, the wall of the bore will have a complete wear-resistant lining.

If the material of the inserts is introduced while still in a formable condition, it may be advantageous for the longitudinally extending recesses to be supplemented by recesses extending tangentially or helically.

BRIEF DESCRIPTION OF DRAWING

Embodiments of the invention will now be described by way of example with reference to the drawing in which.

DETAILED DESCRIPTION OF EMBODIMENTS

Figure 1:
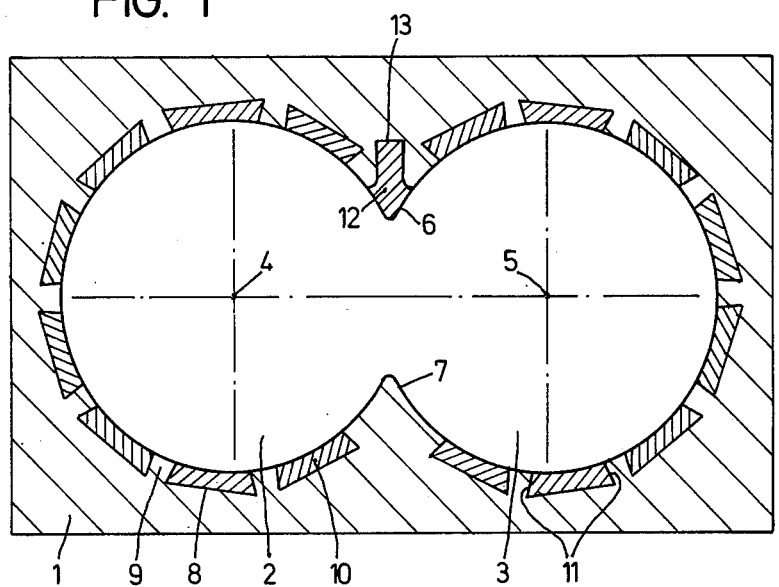
FIG. 1 is a cross-section through a screw extruder housing having two axially parallel bores provided with wearing inserts for a two-shaft screw extruder machine.

FIG. 1 shows a cross-section of a worm gear casing 1 which has two axially parallel bores 2 and 3 for screw shafts, the distance between the axes 4 and 5 in the present case being smaller than the diameter of a bore 2 or 3, so that the two bores 2 and 3 penetrate one another to form at the points where their walls merge so-called saddles 6, 7. Similarly, the distance between the two axes 4 and 5 may also be greater than the diameter of a bore 2 or 3, in which case the two bores, which do not penetrate one another, are connected together by means of suitable apertures, so that in this case also materials driven by the screws therein can pass from one bore into the other. The bores 2 and 3 receive screws (not shown), whose webs have slight clearance between their outer periphery and the walls of the bores.

Axially parallel, rectilinear recesses 8 which are undercut, for example, so as to form a dovetail profile, are provided in the walls of the bores by slotting, broaching, or the like. The recesses 8 are so spaced apart from one another — viewing in each case in the direction of the periphery of the bores 2 or 3 — that longitudinal lands 9 are formed between them, the width of these lands being markedly smaller than the width of the recesses 8, as can be seen in FIG. 1.

Wearing inserts 10 in the form of plates, bars, or strips, which have a cross-sectional profile corresponding to that of the recesses 8, are inserted in the latter. Because of the dovetail profile 11 they are held by positive connections. Furthermore, they may additionally be held in the recesses 8 by the introduction of a suitable adhesive or solder. The wearing inserts 10 may in principle all have the same shape and can therefore easily be prefabricated in relatively large members, and they can then also be used with different diameters of bores 2 and 3, at least within predetermined ranges.

They may in particular be made of materials having extremely great resistance to wear, which are usually extremely brittle. When the wearing inserts 10 are in the form of plates, bars, or strips of this kind, as shown in the form of a plan view of a development in the portion A of FIG. 2, metallic materials are mainly used for the wearing inserts, such as case or sintered bars of hard metal, chilled cast-iron, or cool steels, as well as ceramic materials, such as cutting ceramics or technical ceramics. If, on the other hand, the recesses 8 extending axially parallel are supplemented by recesses 8' extending tangentially or recesses 8'' extending helically, it is possible to use for the formation of the wearing inserts only materials which are filled (spread) into the recesses 8, 8', or 8'' in the form of a formable composition and are hardened; these materials may either be self-hardening or be fired or else fused. Non-metallic materials are suitable for this purpose, such as, for example, enamels, optionally containing dispersed ceramic powders, glass containing similar fillers (heat-resistant, shock-resistant), porcelains, cements, grinding wheel compositions, basalts, self-hardening compositions such as are used, for example, for teeth, molding materials for casting molds, fire clay, sealing compounds, or ceramic compounds. When the recesses 8, 8', or 8'' are produced in this manner as shown in sections B and C of FIG. 2, the lands are not continuous longitudinal lands, but relatively short lands 9' or 9''.

Figure 2:
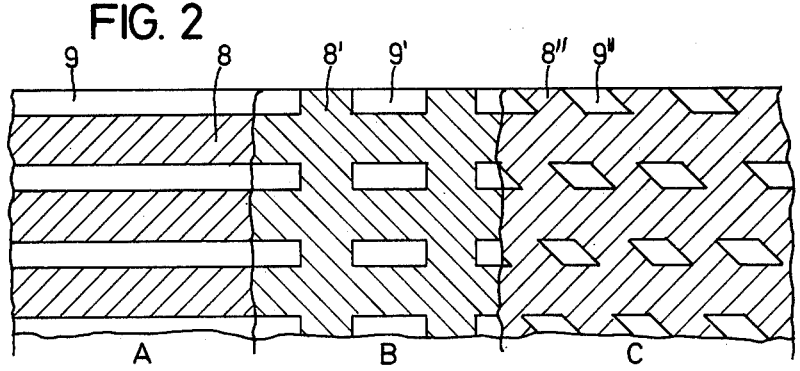
FIG. 2 is a development of part of a screw bore having three different forms of construction and introduction of wearing inserts.

It should however be emphasized that the construction shown in section A of FIG. 2 with continuous longitudinal lands 9 is particularly preferred, because it permits prefabrication of the wearing inserts in the form of continuous sections from which the corresponding required lengths are cut off. In addition to supplementary adhesive bonding or soldering, in this case the inserts can also be pressed or shrunk into the recesses 8. Even if the lands 9, 9', or 9'', which are made of the normal material of the screw extruder housing, are considerably less wear-resistant than the wearing inserts 10, they are subject to considerably less wear than if no wearing inserts 10 at all were provided, since a supporting action is exerted by the wearing inserts 10.

As can be seen in FIG. 1, the saddle 6 is formed by a correspondingly shaped wearing insert 12, which is held in a corresponding recess 13, likewise of dovetail profiles if desired. At the bottom in FIG. 1 no separate wearing insert for the saddle 7 is shown. In this case the saddle is expediently hardened and made wear-resistant in the conventional manner, for example, by nitriding.

Figure 3A:
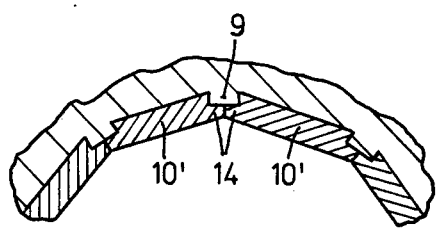
FIGS. 3a to 3d are cross-sections of wearing inserts of different types, each being disposed in a bore in the screw extruder housing.

In the embodiment shown in FIG. 3a the wearing inserts 10' also have lateral projections 14 which engage over the upper face of the lands 9 and also protect them against wear. In addition, it is also shown in FIG. 3a that, unlike the embodiment shown in FIG. 1 in which the surfaces of the wearing inserts 10 are ground to circular shape to correspond to the periphery of the bore, the bore may also have a polygonal cross-section. If the number of wearing inserts disposed on the periphery of a bore is sufficiently large, the differences in diameter resulting from this polygonal shape will be so small as to be acceptable. On the other hand, a considerable simplification in production is thereby achieved by making the surfaces of the inserts flat instead of curved.

Figure 3B:
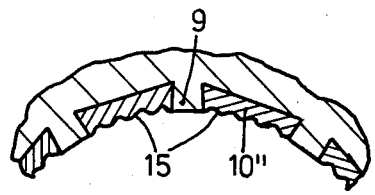

In FIG. 3b it can be seen that the surface 15 of the wearing inserts 10'' can be provided with a profile in any desired manner.

Figure 3C:
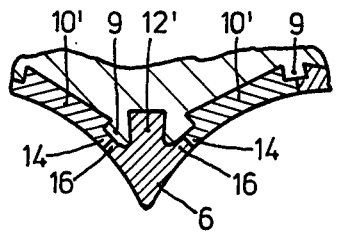

To go beyond the embodiment shown in FIG. 3a, in that shown in FIG. 3c, lateral projections 16 are also provided on the wearing insert 12' for the saddle 6, these projections 16 adjoining the projections 14 on the neighboring inserts 10', covering over the corresponding lands 9.

Figure 3D:
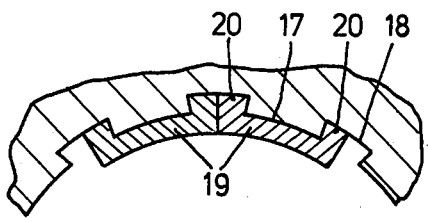

Finally, in the embodiment shown in FIG. 3d recesses 13 which are narrow in relation to the longitudinal lands 17, and which optionally are likewise undercut, are provided. In this case the wearing inserts 19, each of which completely engage over a land 17, has edges 20 which project radially outwards and each of which fills half the width of a recess 18, so that the two neighboring edges 20 of two neighboring wearing inserts 19 fill a recess and are held therein. Here again a suitable adhesive or a cement or the like may additionally be used.

It will be obvious to those skilled in the art that various changes may be made without departing from the scope of the invention and the invention is not to be considered limited to what is shown in the drawing and described in the specification.

What we claim is:

1. In a screw extruder housing for a screw extruder machine, which housing has one or more axially parallel bores for a screw shaft, the wall of each bore being provided with a wear-resistant lining, the improvement wherein:

the wall of each bore is provided over its entire periphery with a plurality of recesses which are bounded by lands formed between adjacent recesses; and each of said recesses has a wearing insert disposed therein, said insert being made of a non-metallic material more wear resistant than the wall and being produced by the process of introducing the insert material into said recesses in the wall in a formable condition, and forming and hardening the inserts in situ.

2. A screw extruder housing according to claim 1, wherein the recesses are formed parallel to the axis of each bore, in the wall of the bore, the recesses having a uniform cross-section throughout their length.

3. A screw extruder housing according to claim 1, wherein the recesses have an undercut profile.

4. A screw extruder housing according to claim 1, wherein additional recesses extending non-longitudinally are provided.

5. A screw extruder housing according to claim 1, wherein the surfaces of the wearing inserts are flush with the surfaces of the lands.

6. A screw extruder housing according to claim 1, wherein the wearing inserts are constructed so as to extend from said recesses and also cover said lands to form a wear resistant lining over the entire periphery of each wall.

7. A method of forming a wear resistant lining on the wall of each bore of a screw extruder housing for a screw extruder machine, which housing has one or more axially parallel bores for a screw shaft, comprising the steps of:

forming a plurality of recesses, which are bounded by lands formed between adjacent recesses, in the wall of each bore over the entire periphery thereof;

introducing into the recesses, in a formable condition, non-metallic material which in the hardened state is more wear resistant than the wall; and hardening the material into a wear resistant lining.

8. A method in accordance with claim 7, further including after said introducing step and before said hardening step, the step of forming the material into a lining disposed not only in the recesses but also covering the lands thereby covering the entire periphery of the wall.

* * * * *